(12) United States Patent
Padmanabhan (10) Patent No.: US 10,207,423 B2
(45) Date of Patent: Feb. 19, 2019

(54) EXTRUDER MIXING ELEMENT FOR A CO-ROTATING TWIN SCREW EXTRUDER

(75) Inventor: Babu Padmanabhan, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 690 days.

(21) Appl. No.: 14/113,117

(22) PCT Filed: Apr. 16, 2012

(86) PCT No.: PCT/IN2012/000269
§ 371 (c)(1),
(2), (4) Date: Oct. 21, 2013

(87) PCT Pub. No.: WO2013/128463
PCT Pub. Date: Sep. 6, 2013

(65) Prior Publication Data
US 2014/0036614 A1 Feb. 6, 2014

(30) Foreign Application Priority Data

Feb. 28, 2012 (IN) .............................. 735/CHE/2012

(51) Int. Cl.
*B29B 7/48* (2006.01)
*B29C 47/62* (2006.01)
(Continued)

(52) U.S. Cl.
CPC .............. *B29B 7/489* (2013.01); *B29B 7/482* (2013.01); *B29C 47/0861* (2013.01);
(Continued)

(58) Field of Classification Search
CPC ........... B29C 47/0861; B29C 47/6075; B29C 47/627; B29C 47/402; B29C 47/6056; B29B 7/489; B29B 7/482
(Continued)

(56) References Cited

U.S. PATENT DOCUMENTS 3,667,733 A   6/1972 Fritsch
5,048,971 A * 9/1991 Wall ........................ B01F 7/042
                                                              366/301
(Continued)

FOREIGN PATENT DOCUMENTS

CN         1231633          10/1999
DE   10 2008 016 862 A1    10/2009
(Continued)

OTHER PUBLICATIONS

Communication from the European Patent Office for related Application No. EP 12731745.1, dated Apr. 10, 2015, 4 pages.
(Continued)

*Primary Examiner* — Marc C Howell
(74) *Attorney, Agent, or Firm* — Klarquist Sparkman, LLP (57) ABSTRACT

A dispersive mixing element for co-rotating twin screw extruder is disclosed. The element for co-rotating twin screw extruder comprises of a continuous flight helically formed thereon having a lead 'L', wherein either the flight transforms at least once from an integer lobe flight into a non-integer lobe flight in a fraction of the lead 'L' and transforms back to an integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

18 Claims, 6 Drawing Sheets

(51) Int. Cl.
    *B29C 47/08* (2006.01)
    *B29C 47/60* (2006.01)
    *B29C 47/40* (2006.01)

(52) U.S. Cl.
    CPC ...... *B29C 47/6056* (2013.01); *B29C 47/6075* (2013.01); *B29C 47/627* (2013.01); *B29C 47/402* (2013.01)

(58) Field of Classification Search
    USPC .......................................................... 366/85
    See application file for complete search history.

(56) References Cited

U.S. PATENT DOCUMENTS

| | | | |
|---|---|---|---|
| 5,932,159 | A | 8/1999 | Rauwendaal |
| 6,116,770 | A | 9/2000 | Kiani et al. |
| 6,783,270 | B1* | 8/2004 | Padmanabhan ..... B29C 47/0861 366/82 |
| 6,974,243 | B2 | 12/2005 | Uphus et al. |
| 2004/0114455 | A1* | 6/2004 | Uphus ....................... B29B 7/42 366/90 |
| 2011/0063940 | A1* | 3/2011 | Padmanabhan ......... B29B 7/007 366/82 |
| 2011/0160381 | A1 | 6/2011 | Konig et al. |
| 2011/0184089 | A1 | 7/2011 | Bierdel et al. |
| 2013/0033956 | A1* | 2/2013 | Kirchhoff ........... B29C 47/6075 366/83 |

FOREIGN PATENT DOCUMENTS

| | | |
|---|---|---|
| DE | 10 2008 029 306 A1 | 12/2009 |
| GB | 2216027 | 10/1989 |
| WO | WO 98/13189 A1 | 4/1998 |
| WO | WO 2011/073121 A2 | 6/2011 |

OTHER PUBLICATIONS

Notice of Reasons for Rejection from the Japanese Office for related Application No. JP 2014-542997, dated Jan. 19, 2015, 4 pages.

* cited by examiner

EXTRUDER MIXING ELEMENT FOR A CO-ROTATING TWIN SCREW EXTRUDER

CROSS-REFERENCE TO RELATED APPLICATIONS

This application is filed under the provisions of 35 U.S.C. § 371 and claims the priority of International Patent Application No. PCT/IN2012/000269 filed on Apr. 16, 2012, and of Indian Patent Application No. 0735/CHE/2012 filed on Feb. 28, 2012. The disclosures of the foregoing international patent application and Indian patent application are hereby incorporated by reference herein in their respective entireties.

The invention relates to a screw element for extruders. Specifically, the invention relates to a mixing element for co-rotating twin screw extruders.

BACKGROUND

Co-rotating twin screw extruders are widely used not only for production, compounding and processing of plastics but also in other industries such as rubber, food, paint and pharmaceutical processing. Co-rotating extruders are built today in a modular manner with different processing elements mounted on screw shafts that allow the extruder to be adapted to different processing requirements. As opposed to single screw machines where the screw flight scrapes the inside of the housing (with clearance), an essential aspect of closely intermeshing co-rotating extruders is that the flights mesh tightly, except for the necessary clearance, and the screws are considered as "self-wiping" or "self-cleaning" with the flights designed to clean each other. The evolution, principles of operation and design principles of co-rotating twin screw extruders are well known and have also been simply explained in the book 'Co-rotating Twin Screw Extruders—Fundamentals, Technology and Applications by Klemens Kohlgruber' published by Carl Hanser Publishers of Munich (2008).

Besides intake and conveying of material, the most significant task carried out by a co-rotating extruder is mixing of the material to produce a homogeneous melt. Mixing in a co-rotating extruder is broadly of two types: distributive mixing and dispersive mixing. Referring to Chapter 9, pages 159-169 of, the book authored by Klemens Kohlgruber referenced above, distributive mixing refers to the distribution of different components or particles in the volume under consideration without necessarily reducing the size of the components or particles. In pure distributive mixing, high flow forces don't necessarily have to be applied. The type and number of re-arrangement processes, not the absolute magnitude of the shear and extension rates are decisive for mixing quality. With an infinite mixing time, i.e., infinite re-arrangements, a completely homogeneous mixture theoretically results. In contrast to distributive mixing, dispersive mixing initially involves disaggregating or dispersing the solid particles, liquid droplets or gas bubbles and generally involves reduction in particle or component size. For dispersion, sufficiently high flow forces must be applied in order to break up agglomerates or overcome surface tension at the interface between the melt and the liquid. Dispersive mixing depends on the absolute magnitude of the shear and extension rates as well as on the duration of the stress.

As also described in U.S. Pat. No. 6,974,243, for dispersive and distributive mixing usually kneading blocks which comprise a plurality of kneading disks with an Erdmenger profile, arranged axially one behind the other and offset angularly with respect to one another, are used. The kneading disks are respectively arranged in pairs, lying opposite one another on the two screw shafts of the co-rotating extruder, and closely intermesh. The mixing process in conventional kneading blocks is to be regarded as a random process, i.e. the mixing work performed in individual volume elements varies in intensity. Therefore, to achieve a high degree of homogeneity of the mixture, considerable mechanical energy has to be expended to ensure that, as far as possible, every volume unit also undergoes shearing. On the basis of an individual kneading disk, a relatively small proportion of the material to be handled is in each case sheared extremely intensely, while by far the greatest part of the material evades the shearing gap between the shearing disk and the barrel wall or between two kneading disks and between the two kneading disks and is consequently sheared only little. For this reason, to ensure a high degree of homogeneity of the mixture, either very long kneading blocks of the known type or else high rotational speeds are required. In any event, considerable mechanical energy is expended and is introduced in the form of heat into the material to be handled. In particular during the processing of rubber mixes, the generation of relatively large amounts of heat is extremely undesirable. U.S. Pat. No. 697,423 also describes elements that transition from a single lobe to a tri lobe and back. However, the element disclosed does not provide for "self-wiping".

While both distributive and dispersive mixing are desirable for a more uniform melt, optimization of the extruder element is generally a compromise of the advantages and disadvantages of both types of mixing. U.S. Pat. No. 5,932,159 describes various types of extruder elements known for distributive and dispersive mixing. Increasing the distributive mixing ability in co-rotating extruder elements typically results in a loss or degradation of the wiping ability of the extruder.

It has therefore been a long felt need to have an extruder element for co-rotating extruders that eliminates or reduces the peak shear experienced by material, increases distributive mixing for more homogeneous mixing and better melt temperature control and also maintains the self-wiping ability of the extruder.

SUMMARY

An element for co-rotating twin screw extruder is disclosed. The element for co-rotating twin screw extruder comprises of a continuous flight helically formed thereon having a lead 'L', wherein either the flight transforms at least once from an integer lobe flight into a non-integer lobe flight in a fraction of the lead 'L' and transforms back to an integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

BRIEF DESCRIPTION OF ACCOMPANYING DRAWINGS

The accompanying drawings illustrate the preferred embodiments of the invention and together with the following detailed description serve to explain the principles of the invention.

FIG. 1 (a) illustrates a pair of co-rotating extruder elements in accordance with an embodiment of the invention, in assembly.

FIG. 1 (b) illustrates the transformation of the element profile of an element of FIG. 1 along the elemental axis in accordance with an embodiment of the invention.

DETAILED DESCRIPTION

A co-rotating extruder comprises a housing having two cylindrical housing bores, each housing bore having an axis disposed parallel to the other axis. A first screw shaft and a second screw shaft are disposed in the first and second housing bores respectively. Extruder processing elements are mounted on the first and second screw shaft and define a mixing zone within the extruder. The extruder element may comprise of a grooved axial bore in which splines of the screw shaft are engaged or other means for mounting on the screw shaft.

An extruder element has one or more lobes that form a flight on the element. The number of lobes has conventionally been an integer and typically varies between one to three lobes. Such extruder elements are referred to as "integer lobe element" in this disclosure. The number of lobes may also be a non-integer and such elements are referred to as "non-integer lobe element" or transitional lobe element.

An element for a co-rotating twin screw extruder is disclosed. The element has a lead 'L' and has a flight helically formed thereon. The flight formed is continuous without any breaks or interruptions. The flight transforms at least once from an integer lobe flight into a non-integer lobe flight in a fraction of the lead 'L' and transforms back to an integer lobe flight in a fraction of the lead 'L' or the flight transforms at least once from a non-integer lobe flight into an integer lobe flight in a fraction of the lead 'L,' and transforms back to a non-integer lobe flight in a fraction of the lead 'L'. This transformation of the element profile forms at least one pin or one groove or both on the element such that on assembly of a pair of elements, the pin profile of one element engages the groove profile on the other element.

Figure 1A:
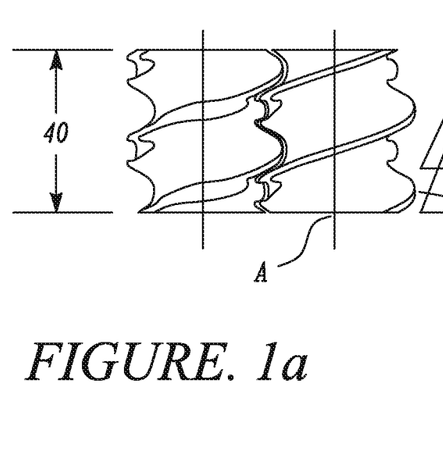
Figure 1B:
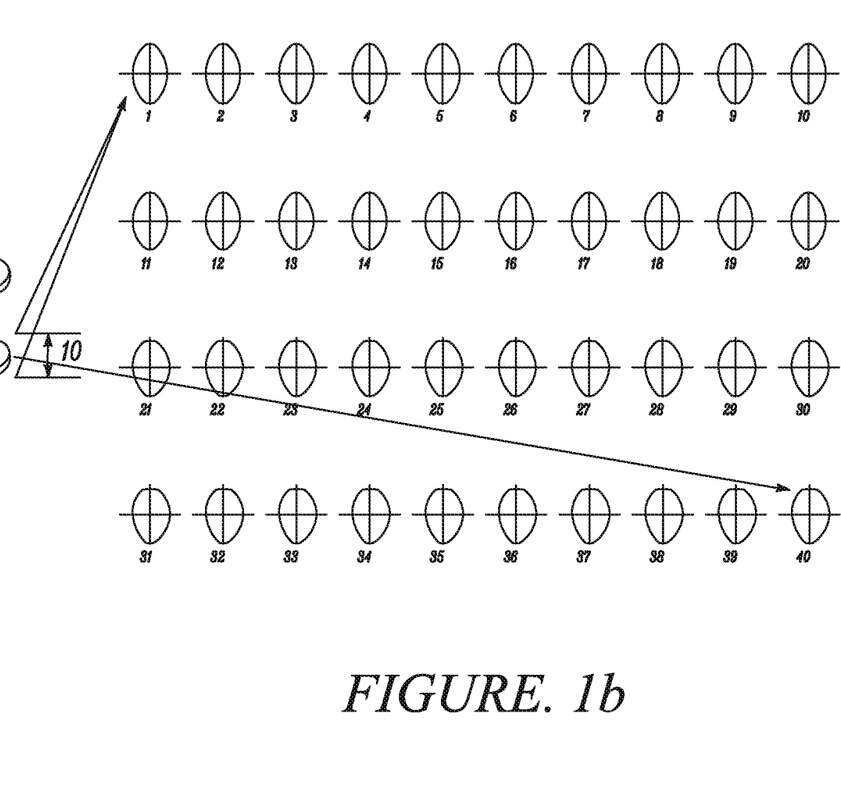

Referring to FIG. 1 (a), a pair of co-rotating extruder elements in accordance with an embodiment of the invention, in assembly, is illustrated. Each element has a length of 40 mm and a lead 'L' also of 40 mm. At point A, the profile of the element is an integer lobe element, bi lobe in the example illustrated. The profile of the element at point A is illustrated in FIG. 1 (b) as profile 1. Profiles 2 to 40 are non-integer lobe profiles. The element transforms from profile 1 to profile 2 and so on successively till profile 40. The transformation of the element from profile 1, an integer lobe element profile, to profile 40, a non-integer lobe element profile, takes place within a fraction of the lead 'L', 5 mm in the embodiment disclosed. The element now transforms back from profile 40 to profile 1 over the next 5 mm. The transformation of the element from profile 40 to profile 1 results in the non-integer lobe element profile to transform into an integer lobe element profile within a fraction of the lead 'L'. In the embodiment of FIG. 1, profile 1 is a bi-lobe element while profile 40 is a 1:2:50 fractional lobe element.

In the embodiment of FIG. 1, the transformation from an integer lobe flight into a non-integer lobe flight as well as the transformation from a non-integer lobe flight into an integer lobe flight takes place in 10 mm or within a fraction of the lead 'L'.

Furthermore, in accordance with an embodiment the transformation from an integer lobe flight into a non-integer lobe flight and back or vice versa may take place a plurality of times. In the embodiment of FIG. 1, the transformation from an integer lobe flight into a non-integer lobe flight and back is repeated four times along the length of the element to obtain the 40 mm element.

While the embodiment of FIG. 1 illustrates a transformation from an integer lobe flight into a non-integer lobe flight in a fraction of the lead 'L' and back in a fraction of the lead 'L,', the element can equally transform from a non-integer lobe flight into an integer lobe flight in a fraction of the lead 'L' and back to a non-integer lobe flight in a fraction of the lead 'L'.

In accordance with an embodiment, the element has multiple flights and a lead 'L'. At least one flight either transforms from an integer lobe flight into a non-integer lobe flight in a fraction of the lead 'L' and transforms back to a integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'. In accordance with an alternate embodiment, the element has multiple flights and a lead 'L' with each flight either transforms from an integer lobe flight into a non-integer lobe flight in a fraction of the lead 'L' and transforms back to a integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

A non-integer lobe element may be a fractional lobed element. A fractional lobed element is an element intermediate a first integer element (n) and a second integer element (N) by a predefined fraction, such that N/n is an integer and the fraction determines the degree of transition between the first integer and the second integer. A single flight lobe and a bi-lobe can form fractional lobes such as 1.2.xx, where xx can be any number from 1 to 99. The numbers 1 to 99 define whether the fractional lobe will look more like a single flight element or a bi-lobed element. The numbers 1 and 2 in the notation 1.2.xx represent the lobe element intermediate a single flight element (1) and a bi-lobe element respectively (2). Examples of a fractional lobe element formed from a single lobe and a bi-lobe element are illustrated in FIG. 1 and more completely described in U.S. Pat. No. 6,783,270.

A single flight element and a four lobe element can also form a fractional element designated by 1.4.xx, where xx could be any number from 1 to 99. Thus a fractional lobe element represented as 1.4.50 represents an element midway between a single flight and a four lobe element. Similarly, a single lobe element and a tri-lobe element [1.3.xx] or a bi-lobe and a four lobe element [2.4.xx] may also be combined. These combinations result in a large number of fractional lobe elements.

A non-integer lobe element may be an irrational number lobed element. Irrational number lobed elements are described in WO 2011/073121 and the teachings of the same are incorporated herein.

The element as taught by this disclosure may therefore transform from a regular or integer lobe flight to a fractional lobe flight in a fraction of the lead "L' and back or may transform from a from a regular or integer lobe flight to an irrational number lobe flight in a fraction of the lead "L' and back.

Figure 2:
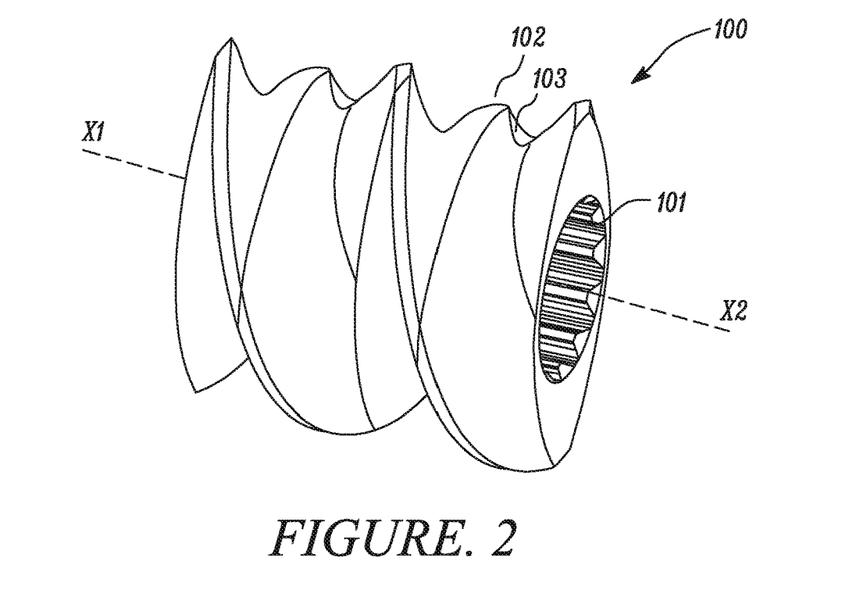
FIG. 2 illustrates a solid isometric view of an element in accordance with an embodiment of the invention.
Figure 3:
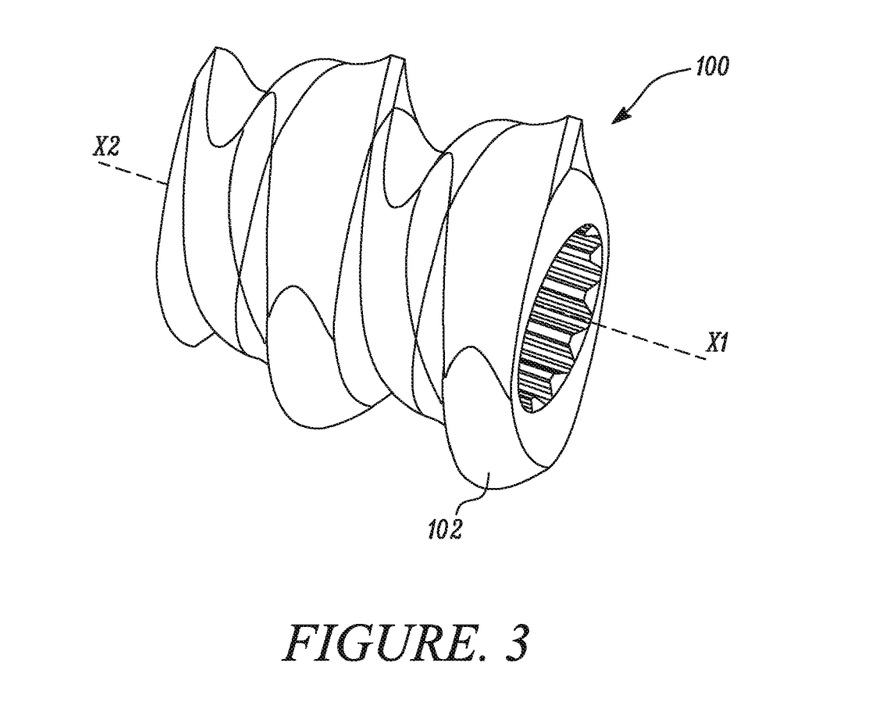
FIG. 3 illustrates an alternate solid isometric view of the element of FIG. 2 in accordance with an embodiment of the invention.

Referring to FIGS. 2 to 9, different views of an element (100) in accordance with an embodiment of the invention are illustrated. FIGS. 2 and 3 illustrate solid isometric views of the element (100) having a central bore (101) with splines formed thereon for mounting the element on a screw shaft of an extruder. The central bore extends along element axis X1-X2. While FIG. 2 views the element from the end X2 of the element axis, FIG. 3 views the element from the end X1 of the element axis. The element transforms from an integer lobe element into a non-integer lobe element, fractional lobe element with the fraction 1:2:50, and back to an integer lobe element four times along the axis X1-X2. Pins (102) and grooves are (103) are formed on the element.

Figure 4:
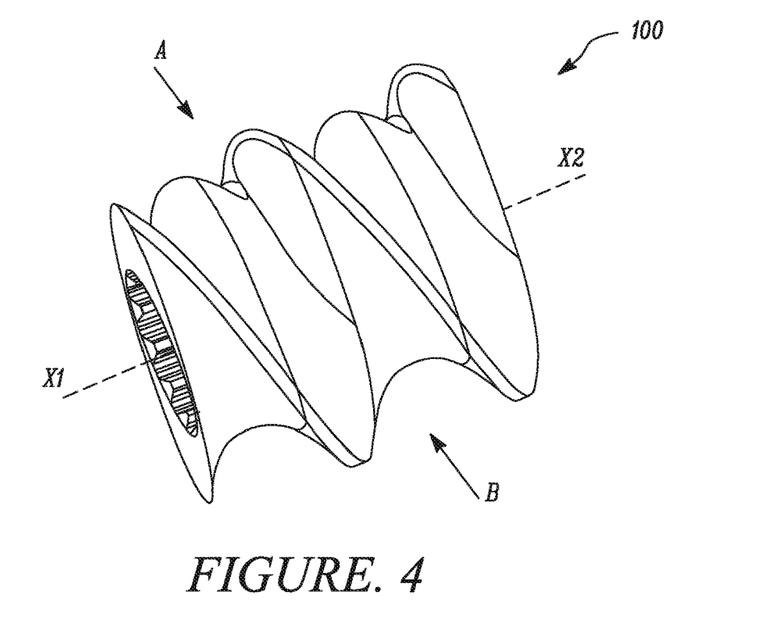
FIG. 4 illustrates an isometric line drawing of the element of FIGS. 2 and 3 along element axis X1-X2.
Figure 5:
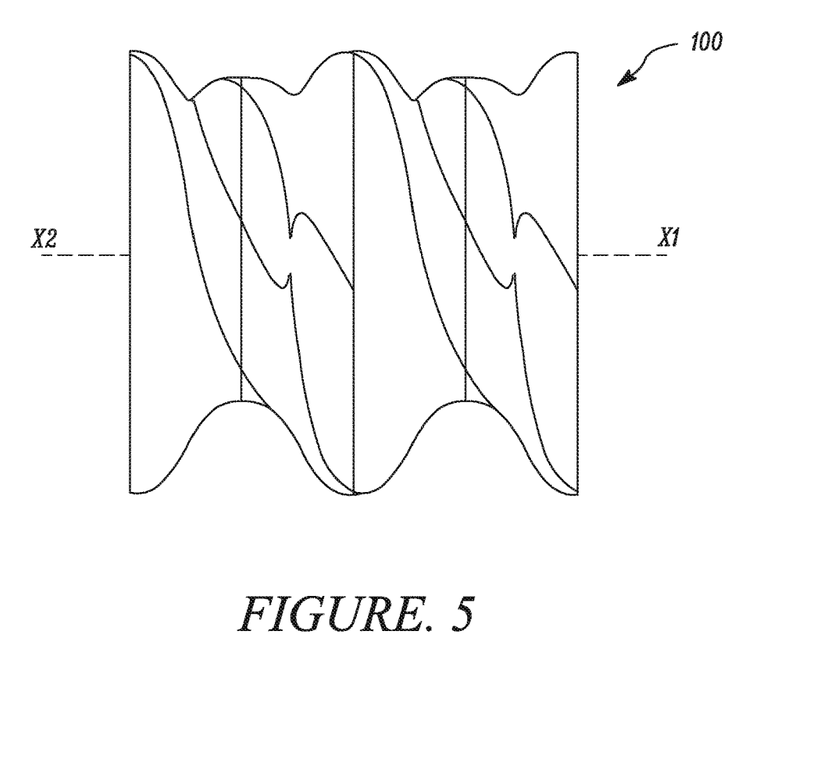
FIG. 5 illustrates the left side view of the element of FIG. 4.
Figure 6:
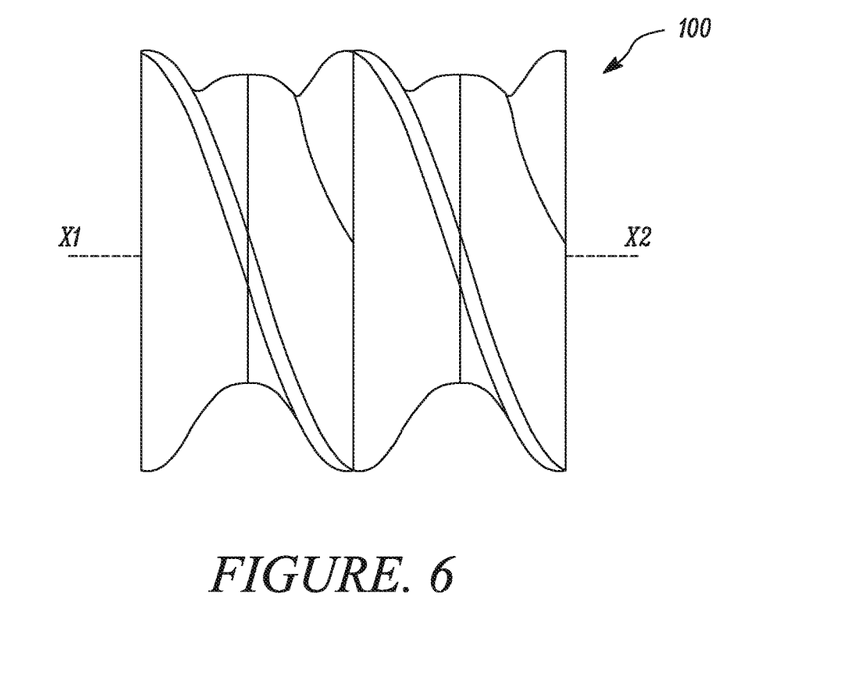
FIG. 6 illustrates the right side view of the element of FIG. 4.

FIG. 4 illustrates an isometric line drawing of the element of FIGS. 2 and 3 along element axis X1-X2. FIG. 5 illustrates the left side view or the view from side A of the cross sectional axis A-B of FIG. 4 while FIG. 6 illustrates the right side view or the view from side B of the cross sectional axis A-B of FIG. 4.

Figure 7:
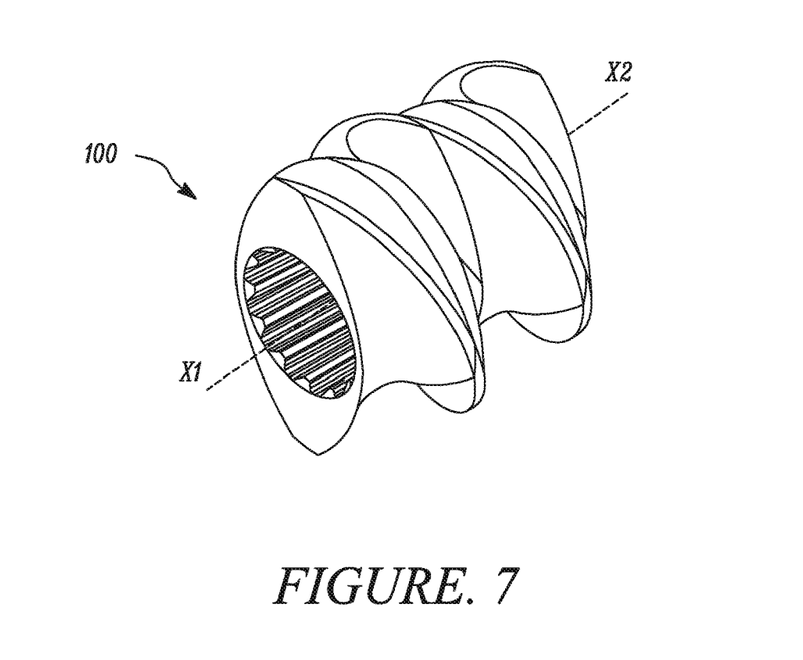
FIG. 7 illustrates the right side view of the element of FIG. 4 by rotating the element anti-clockwise along axis X1-X2.
Figure 8:
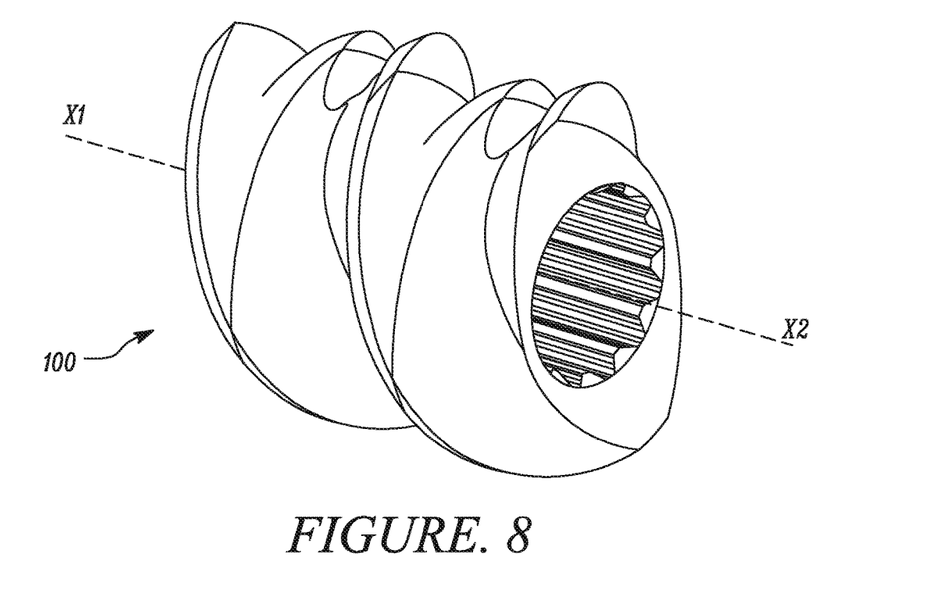
FIG. 8 also illustrates the right side view of the element of FIG. 4 by rotating the element anti-clockwise along axis X1-X2, and as seen from end X2 of the elemental axis X1-X2.
Figure 9:
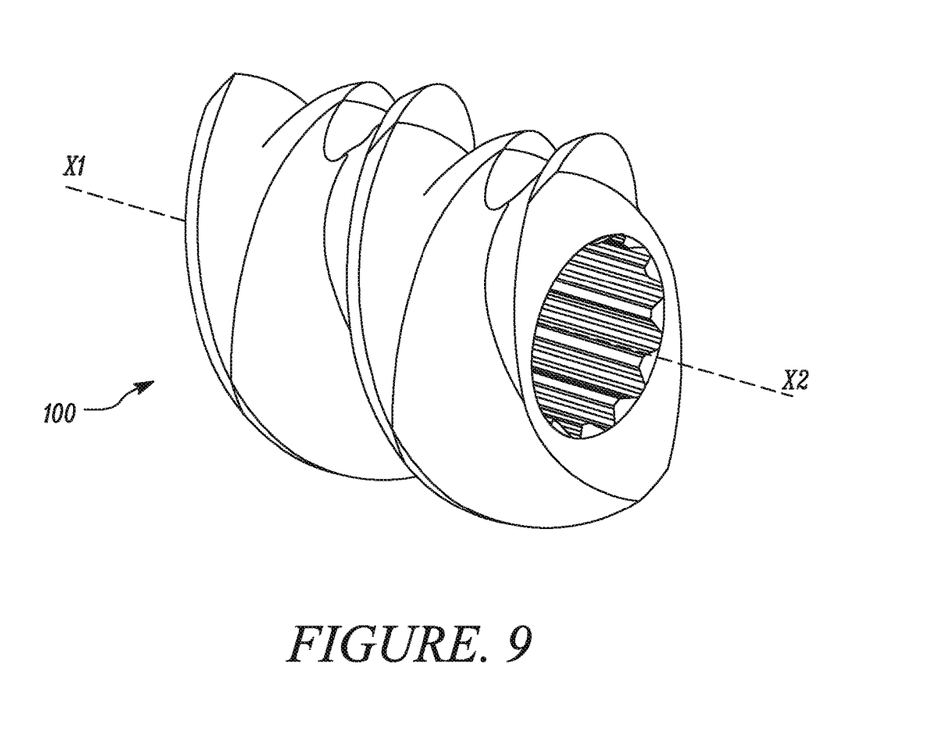
FIG. 9 is the solid elemental view of the element of FIG. 8.

FIG. 7 illustrates the element as seen from side B of the cross sectional axis A-B of FIG. 4 by rotating the element anti-clockwise along axis X1-X2. FIG. 8 also illustrates the element as seen from side B of the cross sectional axis A-B of FIG. 4 by rotating the element anti-clockwise along axis X1-X2, and as seen from end X2 of the elemental axis X1-X2. FIG. 9 is the solid elemental view of the element of FIG. 8.

Figure 10:
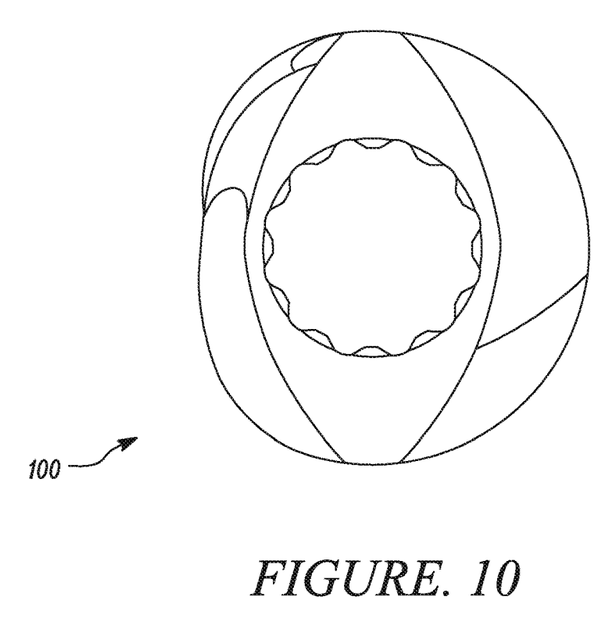
FIG. 10 illustrates the front view of the element of FIG. 4.
Figure 11:
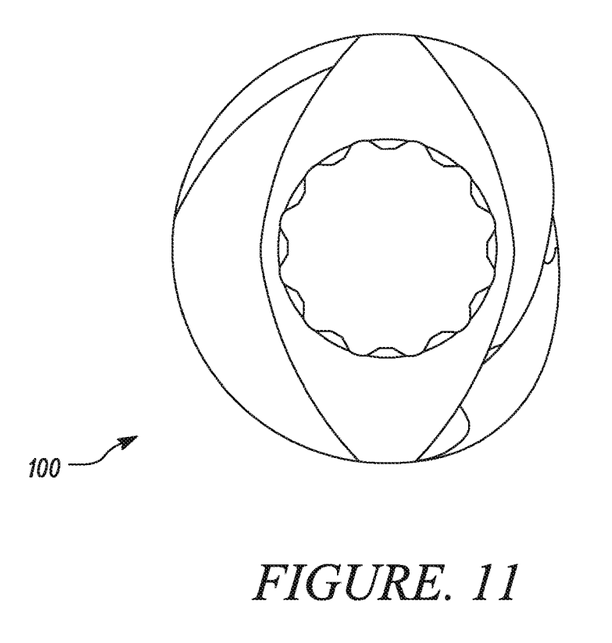
FIG. 11 illustrates the back view of the element of FIG. 4.

FIGS. 10 and 11 illustrate the front and back views of the element of FIG. 4. As seen from the front and back view the element is a two lobe element at the ends and transforms into a non-integer element and back along the elemental axis X1-X2.

Specific Embodiments are Described Below

An element for co-rotating twin screw extruder is disclosed. The element for co-rotating twin screw extruder comprises of a continuous flight helically formed thereon having a lead 'L', wherein either the flight transforms at least once from an integer lobe flight into a non-integer lobe flight in a fraction of the lead 'L' and transforms back to an integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

Such element(s) for co-rotating twin screw extruder wherein the non-integer lobe flight is a fractional lobe flight.

Such element(s) for co-rotating twin screw extruder wherein the non-integer lobe flight is an irrational number lobe flight.

Such element(s) for co-rotating twin screw extruder wherein the transformation of the flight from an integer lobe flight into a non-integer lobe flight in a fraction of the lead 'L' and transforming back to an integer lobe flight in a fraction of the lead 'L' or the transformation of the flight from a non-integer lobe flight into an integer lobe flight in a fraction of the lead 'L' and transforming back to a non-integer lobe flight in a fraction of the lead 'L' forms a pin and groove on the element.

Such element(s) for co-rotating twin screw extruder wherein the element has multiple flights and a lead 'L' with at least one flight either transforms from an integer lobe flight into a non-integer lobe flight in a fraction of the lead 'L' and transforms back to a integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

Such element(s) for co-rotating twin screw extruder wherein the element has multiple flights and a lead 'L' with each flight either transforms from an integer lobe flight into a non-integer lobe flight in a fraction of the lead 'L' and transforms back to a integer lobe flight in a fraction of the lead 'L' or the flight transforms at least once from a non-integer lobe flight into an integer lobe flight in a fraction of the lead 'L' and transforms back to a non-integer lobe flight in a fraction of the lead 'L'.

Such element(s) for co-rotating twin screw extruder wherein the flight transforms a plurality of times from an integer lobe flight into a non-integer lobe flight in a fraction of the lead 'L' and transforms back to an integer lobed flight in a fraction of the lead 'L'.

Such element(s) for co-rotating twin screw extruder wherein the flight transforms from an integer lobe flight into a non-integer lobe flight and transforms back to a integer lobe flight in a fraction of the lead 'L'.

INDUSTRIAL APPLICABILITY

The element as taught by the disclosure is a mixing element suitable for use in co-rotating twin screw extruders. The element is suitable for achieving a homogeneous melt mix and reducing material degradation by excessive shear. The element as taught also does not compromise on the self-wiping ability of the co-rotating extruder.

I claim:

1. A self-wiping element for a co-rotating twin screw extruder comprising a continuous flight helically formed thereon having a lead 'L', the lead'L' comprising a plurality of fractions;

wherein either the flight transforms from a first integer lobe flight into a non-integer lobe flight in a first fraction of the lead 'L' and back to the first integer lobe flight in a second fraction of the lead 'L' or the flight transforms from a first non-integer lobe flight into an integer lobe flight in the first fraction of the lead 'L ' and transforms back to the first non-integer lobe flight in the second fraction of the lead 'L';

wherein the transformation either from the first integer lobe flight into the non-integer lobe flight and back to the first integer lobe flight or the transformation from the first non-integer lobe flight into the integer lobe flight and back to the first non-integer lobe flight takes place a plurality of times along a lead of the element; and wherein the transformation of the flight from the first integer lobe flight into the non-integer lobe flight in the first fraction of the lead 'L' and transforming back to the first integer lobe flight in the second fraction of the lead 'L' or the transformation of the flight from the first non-integer lobe flight into the integer lobe flight in the first fraction of the lead 'L' and transforming back to the first non-integer lobe flight in the second fraction of the lead 'L' forms a pin and groove on the element.

2. An element as claimed in claim 1 wherein the non-integer lobe flight is a fractional lobe flight.

3. An element as claimed in claim 1 wherein the non-integer lobe flight is an irrational number lobe flight.

4. An element as claimed in claim 1 wherein the element has multiple flights and a lead 'L' with at least one flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L' and transforms back to the first non-integer lobe flight in the second fraction of the lead 'L'.

5. An element as claimed in claim 1 wherein the element has multiple flights and a lead 'L ' with each flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L ' and transforms back to the first non-integer lobe flight in the second fraction of the lead 'L'.

6. An element as claimed in claim 1 wherein the flight transforms from the first integer lobe flight into the non-integer lobe flight in the first fraction of the lead 'L' and transforms back to the first integer lobe flight in the second fraction of the lead 'L'.

7. A co-rotating twin screw extruder system comprising:
a housing having a first housing bore and a second housing bore, the first housing bore having an axis disposed parallel to an axis of the second housing bore;
at least one first screw shaft being disposed in the first housing bore and at least one second screw shaft being disposed in the second housing bore, the at least one first screw shaft and the second screw shaft having at least one self-wiping element comprising a continuous flight helically formed thereon having a lead 'L ' , the lead 'L ' comprising a plurality of fractions;
wherein either the flight transforms from a first integer lobe flight into a non-integer lobe flight in a first fraction of the lead 'L' and back to the first integer lobe flight in a second fraction of the lead 'L' or the flight transforms from a first non-integer lobe flight into an integer lobe flight in the first fraction of the lead 'L' and back to the first non-integer lobe flight in the second fraction of the lead 'L';
wherein the transformation either from the first integer lobe flight into the non-integer lobe flight and back to the first integer lobe flight or the transformation from the first non-integer lobe flight into the integer lobe flight and back to the first non-integer lobe flight takes place a plurality of times along a lead of the element; and
wherein the transformation of the flight from the first integer lobe flight into the non-integer lobe flight in the first fraction of the lead 'L' and transforming back to the first integer lobe flight in the second fraction of the lead 'L' or the transformation of the flight from the first non-integer lobe flight into the integer lobe flight in the first fraction of the lead 'L' and transforming back to the first non-integer lobe flight in the second fraction of the lead 'L' forms a pin and groove on the element.

8. The co-rotating twin screw extruder system as claimed in claim 7 wherein the non-integer lobe flight of the element is a fractional lobe flight.

9. The co-rotating twin screw extruder system as claimed in claim 7 wherein the non-integer lobe flight of the element is an irrational number lobe flight.

10. The co-rotating twin screw extruder system as claimed in claim 7 wherein the element has multiple flights and a lead 'L' with at least one flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L' and transforms back to the first non-integer lobe flight in the second fraction of the lead 'L'.

11. The co-rotating twin screw extruder system as claimed in claim 7 wherein the element has multiple flights and a lead 'L' with each flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L' and transforms back to the first non-integer lobe flight in the second fraction of the lead 'L'.

12. The co-rotating twin screw extruder system as claimed in claim 7 wherein the flight of the element transforms from the first integer lobe flight into the non-integer lobe flight in the first fraction of the lead 'L ' and transforms back to the first integer lobe flight in the second fraction of the lead 'L'.

13. A self-wiping element for a co-rotating twin screw extruder system, the element comprising a continuous flight having a non-zero flight width helically formed thereon, the element having a lead 'L', the lead 'L' comprising a plurality of fractions;
wherein either the flight transforms from a first integer lobe flight into a non-integer lobe flight in a first fraction of the lead 'L' and back to the first integer lobe flight in a second fraction of the lead 'L' or the flight transforms from a first non-integer lobe flight into an integer lobe flight in the first fraction of the lead 'L' and back to the first non-integer lobe flight in the second fraction of the lead 'L';
wherein the transformation either from the first integer lobe flight into the non-integer lobe flight and back to the first integer lobe flight or the transformation from the first non-integer lobe flight into the integer lobe flight and back to the first non-integer lobe flight takes place a plurality of times along a lead of the element; and
wherein the transformation of the flight from the first integer lobe flight into the non-integer lobe flight in the first fraction of the lead 'L' and transforming back to the first integer lobe flight in the second fraction of the lead 'L' or the transformation of the flight from the first non-integer lobe flight into the integer lobe flight in the first fraction of the lead 'L' and transforming back to the first non-integer lobe flight in the second fraction of the lead 'L' forms a pin and groove on the element.

14. The self-wiping element as claimed in claim 13 wherein the non-integer lobe flight of the element is a fractional lobe flight.

15. The self-wiping element as claimed in claim 13 wherein the non-integer lobe flight of the element is an irrational number lobe flight.

16. The self-wiping element as claimed in claim 13 wherein the element has multiple flights and a lead 'L' with at least one flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L' and transforms back to the first non-integer lobe flight in the second fraction of the lead 'L'.

17. The self-wiping element as claimed in claim 13 wherein the element has multiple flights and a lead 'L' with each flight either transforms from the first integer lobe flight into the non-integer lobe flight in the first fraction of the lead 'L' and transforms back to the first integer lobe flight in the second fraction of the lead 'L' or the flight transforms at least once from the first non-integer lobe flight into the integer lobe flight in the first fraction of the lead 'L' and transforms back to the first non-integer lobe flight in the second fraction of the lead 'L'.

18. The self-wiping element as claimed in claim 13 wherein the flight of the element transforms from the first integer lobe flight into the non-integer lobe flight in the first fraction of the lead 'L' and transforms back to the first integer lobe flight in the second fraction of the lead 'L'.

\* \* \* \* \*